(12) United States Patent
Fox

(10) Patent No.: US 6,308,131 B1
(45) Date of Patent: Oct. 23, 2001

(54) METHOD OF PRE-PLANNING THE LOADING OF AIRCRAFT

(75) Inventor: Peter F. Fox, Orlando, FL (US)

(73) Assignee: Capital Cargo International Airlines, Inc., Orlando, FL (US)

( * ) Notice: Subject to any disclaimer, the term of this patent is extended or adjusted under 35 U.S.C. 154(b) by 0 days.

(21) Appl. No.: 09/578,584

(22) Filed: May 25, 2000

(51) Int. Cl.$^7$ .................................................. G01M 1/12
(52) U.S. Cl. .................... 701/124; 702/174; 177/136; 73/65.05
(58) Field of Search ........................ 701/124; 702/174, 702/175; 177/136; 73/65.05, 65.06

(56) References Cited

U.S. PATENT DOCUMENTS

| | | | |
|---|---|---|---|
| 4,225,926 | * 9/1980 | Wendt | 364/463 |
| 4,446,524 | 5/1984 | Wendt | 364/463 |
| 4,479,560 | 10/1984 | Day | 177/147 |
| 4,502,555 | * 3/1985 | Gower | 177/25 |
| 4,639,872 | * 1/1987 | McHale et al. | 364/463 |
| 4,935,885 | 6/1990 | McHale et al. | 364/567 |
| 5,034,896 | 7/1991 | Orgun et al. | 364/463 |
| 5,214,586 | * 5/1993 | Nance | 364/463 |
| 5,521,827 | 5/1996 | Lindberg et al. | 364/463 |
| 5,583,777 | * 12/1996 | Power | 364/463 |
| 5,884,238 | * 3/1999 | Noll et al. | 702/150 |
| 6,032,090 | 2/2000 | von Bose | 701/37 |
| 6,064,981 | 5/2000 | Barni et al. | 705/26 |

* cited by examiner

*Primary Examiner*—Michael J. Zanelli
*Assistant Examiner*—Eric M Gibson
(74) *Attorney, Agent, or Firm*—Allen, Dyer, Doppelt, Milbrath & Gilchrist, P.A.

(57) ABSTRACT

A method of pre-planning and loading of aircraft before physically loading pallets on the aircraft is disclosed. An identifier is entered into a processor to identify an aircraft to be loaded. Based on the identifier, a data file relating to the loading limitations of the aircraft to be loaded is retrieved from the database. Data regarding the amount of fuel upon departure is entered, as well as the weights of pallets to be loaded into pallet positions. A user selects a first option for calculating within the processor the optimum location of pallets and pallet positions to obtain the optimum center of gravity balance of the aircraft, or the user selects a second option for determining if the center of gravity of the aircraft based on the entered location of pallets and pallet positions are within the center of gravity limits of the aircraft.

32 Claims, 15 Drawing Sheets

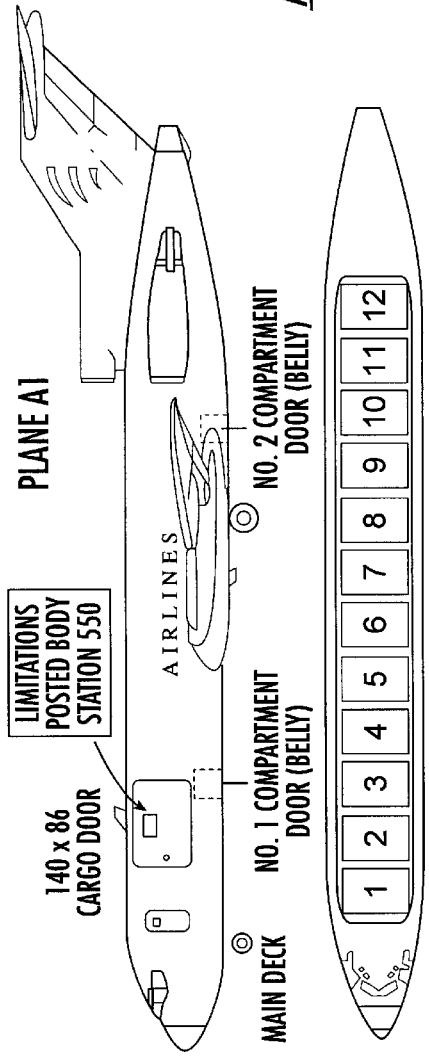

FIG. 11.

MAXIMUM PERMISSIBLE POSITION WEIGHT LIMITS - UPPER AND LOWER LOBES (ALL WEIGHTS ARE LISTED IN US POUNDS)

| | 1 | 2 | 3 | 4 | 5 | 6 | 7 | 8 | 9 | 10 | 11 | 12 |
|---|---|---|---|---|---|---|---|---|---|---|---|---|
| | MAXIMUM | MAXIMUM | MAXIMUM | MAXIMUM | MAXIMUM | MAXIMUM | MAXIMUM | MAXIMUM | MAXIMUM | MAXIMUM | MAXIMUM | MAXIMUM |
| UPPER DECK LIMIT | 4,700 | 4,000 | 4,000 | 4,000 | 6,500 | 8,000 | 10,000 | 10,000 | 8,000 | 7,400 | 7,904 | 4,600 |
| ADJACENT UPPER DECK POSITION LIMIT | 8,700 | 8,000 | 8,000 | 10,500 | 14,500 | 18,000 | 20,000 | 18,000 | 14,501 | 15,304 | 12,504 | |
| LOWER LOBE LIMIT | | 552 | 1,112 | 1,112 | 1,112 | | | | 1,840 | 1,961 | 2,094 | 1,104 |
| ZONE LIMIT (UPPER & LOWER LOBE) | 4,700 | 4,552 | 5,112 | 5,112 | 7,612 | 8,000 | 10,000 | 10,000 | 9,452 | 9,361 | 9,998 | 4,600 |
| COMBINED ZONE LIMIT (UPPER & LOWER LOBE) | 9,800 | 11,325 | 12,450 | 14,950 | 16,950 | 18,225 | 19,425 | 17,651 | 19,641 | 14,729 | | |
| CUMULATIVE ZONE LIMIT | 4,700 (1) | | | | | | | | | | | 5,455 (12) |
| | 10,300 (1 & 2) | | | | | | | | | | 11,692 (11 & 12) | |
| | 16,200 (1~3) | | | | | | | | | 19,335 (10~12) | | |
| | 22,400 (1~4) | | | | | | | | 25,749 (9~12) | | | |
| | 31,800 (1~5) | | | | | | | 31,651 (76.4% OF 8 + 9~12) | | | | |
| | 34,100 (1~5 + 77.5% OF 6) | | | | | | | | | | | |

THE TABLE ABOVE LISTS POSITION LIMITATIONS FOR ALL ZERO FUEL WEIGHTS FROM 135,000 POUNDS TO 152,000 POUNDS.
FOR ZERO FUEL WEIGHTS THAT ARE LESS THAN 135,000 POUNDS, REDUCE THE POSITION LIMIT WEIGHT BY 1% FOR EACH 2,000 POUNDS THAT ZERO FUEL WEIGHT IS BELOW 135,500 POUNDS*.
* LIMITATIONS MAY BE DERIVED FROM THE REDUCED ZERO FUEL WEIGHT TABLES IN THE "AIRCRAFT SPECIFIC" CHAPTER OF THE B-727 WEIGHT & BALANCE OPERATIONS PROCEDURES MANUAL.

PLANE A1 — REDUCED CARGO LOAD WEIGHT POSITION LIMITS TABLE

POSITION LIMIT WEIGHTS FOR CARGO WEIGHTS AT LESS THAN 40,433 - UPPER AND LOWER LOBES.

WEIGHT REDUCTION X 4,000 lbs

| POSITION | 8,433 ~ <12,433 | 12,433 ~ <16,433 | 16,433 ~ <20,433 | 20,433 ~ <24,433 | 24,433 ~ <28,433 | 28,433 ~ <32,433 | 32,433 ~ <36,433 | 36,433 ~ <40,433* |
|---|---|---|---|---|---|---|---|---|
| 1 | 3,984 | 4,042 | 4,136 | 4,230 | 4,324 | 4,418 | 4,512 | 4,606 |
| 2 | 3,360 | 3,440 | 3,520 | 3,600 | 3,680 | 3,760 | 3,840 | 3,920 |
| 3 | 3,360 | 3,440 | 3,520 | 3,600 | 3,680 | 3,760 | 3,840 | 3,920 |
| 4 | 3,360 | 3,440 | 3,520 | 3,600 | 3,680 | 3,760 | 3,840 | 3,920 |
| 5 | 5,460 | 5,590 | 5,590 | 5,825 | 5,850 | 6,110 | 6,240 | 6,370 |
| 6 | 6,720 | 6,880 | 7,040 | 7,200 | 7,360 | 7,520 | 7,680 | 7,840 |
| 7 | 8,400 | 8,600 | 8,800 | 9,000 | 9,200 | 9,400 | 9,600 | 9,800 |
| 8 | 8,400 | 8,600 | 8,800 | 9,000 | 9,200 | 9,400 | 9,600 | 9,800 |
| 9 | 6,720 | 6,880 | 7,040 | 7,200 | 7,360 | 7,520 | 7,680 | 7,840 |
| 10 | 6,216 | 6,364 | 6,512 | 6,660 | 6,808 | 6,956 | 7,104 | 7,252 |
| 11 | 6,639 | 6,797 | 6,955 | 7,113 | 7,271 | 7,429 | 7,587 | 7,745 |
| 12 | 3,864 | 3,956 | 4,048 | 4,140 | 4,232 | 4,324 | 4,416 | 4,508 |
| 1 + 2 | 7,308 | 7,482 | 7,656 | 7,830 | 8,004 | 8,178 | 8,352 | 8,526 |
| 2 + 3 | 6,720 | 6,880 | 7,040 | 7,200 | 7,360 | 7,520 | 7,680 | 7,840 |
| 3 + 4 | 6,720 | 6,880 | 7,040 | 7,200 | 7,360 | 7,520 | 7,680 | 7,840 |
| 4 + 5 | 8,820 | 9,030 | 9,240 | 9,450 | 9,660 | 9,870 | 10,080 | 10,290 |
| 5 + 6 | 12,180 | 12,470 | 12,760 | 13,050 | 13,340 | 13,630 | 13,920 | 14,210 |
| 6 + 7 | 15,120 | 15,480 | 15,840 | 16,200 | 16,560 | 16,920 | 17,280 | 17,640 |
| 7 + 8 | 16,800 | 17,200 | 17,600 | 18,000 | 18,400 | 18,800 | 19,200 | 19,600 |
| 8 + 9 | 15,120 | 15,480 | 15,840 | 16,200 | 16,560 | 16,920 | 17,280 | 17,640 |
| 9 + 10 | 12,180 | 12,470 | 12,760 | 13,050 | 13,340 | 13,630 | 13,920 | 14,210 |
| 10 + 11 | 12,855 | 13,161 | 13,467 | 13,773 | 14,079 | 14,385 | 14,691 | 14,997 |
| 11 + 12 | 10,503 | 10,753 | 11,003 | 11,253 | 11,503 | 11,753 | 12,003 | 12,553 |

FIG. 12.

THE LIMITS IN THE TABLE ABOVE ARE MORE RESTRICTIVE THAN THE REQUIREMENTS OF THE STC. THESE WEIGHTS ENSURE POSITION WEIGHT LIMITATION COMPLIANCE WHEN OPERATING AT ZERO FUEL WEIGHTS BELOW THESE CONVERTED TO CARGO WEIGHTS. TO OBTAIN THE SPECIFICALLY CALCULATED WEIGHT REDUCTION, WHICH WILL PROVIDE EQUALLY OR HIGHER LIMITS, THE FORMULA OF 1% PER EACH 2,000 POUND REDUCTION BELOW THE TOTAL CARGO WEIGHT IN POUNDS (UPPER RIGHT COLUMN *) MUST BE APPLIED TO EACH POSITION LIMITATION.

PLANE B2

REDUCED ZERO FUEL WEIGHT POSITION LIMITS TABLE

POSITION LIMIT WEIGHTS FOR CARGO WEIGHTS AT LESS THAN 41,538 - UPPER AND LOWER LOBES.

| | 9,538 ~ <13,538 | 13,538 ~ <17,538 | 17,538 ~ <21,538 | 21,538 ~ <25,538 | 25,538 ~ <29,538 | 29,538 ~ <33,538 | 33,538 ~ <37,538 | 37,538 ~ <41,538* |
|---|---|---|---|---|---|---|---|---|
| 1 | 4,067 | 4,164 | 4,260 | 4,357 | 4,454 | 4,551 | 4,648 | 4,745 |
| 2 | 6,334 | 6,485 | 6,636 | 6,786 | 6,937 | 7,088 | 7,239 | 7,390 |
| 3 | 4,636 | 4,747 | 4,857 | 4,968 | 5,078 | 5,188 | 5,299 | 5,409 |
| 4 | 4,636 | 4,747 | 4,857 | 4,968 | 5,078 | 5,188 | 5,299 | 5,409 |
| 5 | 6,720 | 6,880 | 7,040 | 7,200 | 7,360 | 7,520 | 7,680 | 7,840 |
| 6 | 6,720 | 6,880 | 7,040 | 7,200 | 7,360 | 7,520 | 7,680 | 7,840 |
| 7 | 8,400 | 8,600 | 8,800 | 9,000 | 9,200 | 9,400 | 9,600 | 9,800 |
| 8 | 8,400 | 8,600 | 8,800 | 9,000 | 9,200 | 9,400 | 9,600 | 9,800 |
| 9 | 6,720 | 6,880 | 7,040 | 7,200 | 7,360 | 7,520 | 7,680 | 7,840 |
| 10 | 6,461 | 6,615 | 6,768 | 6,922 | 7,076 | 7,230 | 7,384 | 7,538 |
| 11 | 6,166 | 6,313 | 6,460 | 6,606 | 6,753 | 6,900 | 7,047 | 7,194 |
| 12 | 2,856 | 2,924 | 2,992 | 3,060 | 3,128 | 3,196 | 3,264 | 3,332 |
| 1 + 2 | 8,786 | 8,995 | 9,204 | 9,414 | 9,623 | 9,832 | 10,041 | 10,250 |
| 2 + 3 | 10,971 | 11,232 | 11,493 | 11,754 | 12,016 | 12,277 | 12,538 | 12,799 |
| 3 + 4 | 9,273 | 9,494 | 9,715 | 9,936 | 10,156 | 10,377 | 10,598 | 10,892 |
| 4 + 5 | 11,358 | 11,897 | 11,897 | 12,168 | 12,438 | 12,708 | 12,972 | 13,249 |
| 5 + 6 | 13,004 | 13,314 | 13,624 | 13,933 | 14,243 | 14,553 | 14,862 | 14,172 |
| 6 + 7 | 15,120 | 15,480 | 15,840 | 16,200 | 16,560 | 16,920 | 17,280 | 17,640 |
| 7 + 8 | 16,800 | 17,200 | 17,600 | 18,000 | 18,400 | 18,800 | 19,200 | 19,600 |
| 8 + 9 | 15,120 | 15,480 | 15,840 | 16,200 | 16,560 | 16,920 | 17,280 | 17,640 |
| 9 + 10 | 10,441 | 10,689 | 10,938 | 11,187 | 11,435 | 11,684 | 11,932 | 12,181 |
| 10 + 11 | 12,627 | 12,928 | 13,229 | 13,529 | 13,830 | 14,131 | 14,431 | 14,732 |
| 11 + 12 | 9,859 | 10,093 | 10,328 | 10,563 | 10,798 | 11,032 | 11,267 | 11,502 |

FIG. 14.

METHOD OF PRE-PLANNING THE LOADING OF AIRCRAFT

FIELD OF THE INVENTION

This invention relates to methods of loading aircraft, and more particularly, this invention relates to a method of pre-planning the loading of an aircraft using center of gravity calculations before physically loading pallets on the aircraft.

BACKGROUND OF THE INVENTION

Determining the center of gravity in an aircraft is important for maintaining aerodynamic control over the aircraft as changes occur over various aerodynamic control surfaces, such as when the elevator, rudder, or ailerons are maneuvered and adjusted by the pilot. The amount of force generated by each aerodynamic control surface changes as the control surfaces change and the aircraft rotates about a point known as the center of gravity. This is the average location of the weight of the aircraft where the mass (and weight) are actually distributed through the airplane. Determining where pallets of different weights are positioned within pallet positions of an aircraft is important to maintain the center of gravity and not have too much weight in one part of the aircraft. Often weight sensing devices are used, such as shown in U.S. Pat. No. 4,446,524 where an apparatus for loading and unloading an aircraft ascertains the individual weight of any type of load, including passengers and hand baggage. Portable pallet weighing and other apparatus are used for determining the weight and center of gravity of an aircraft, such as in U.S. Pat. Nos. 4,935,885 and 4,479,560. Some apparatus, such as shown in U.S. Pat. No. 6,032,090, use an on-board aircraft system for determining the weight and load-related characteristics of an aircraft having landing gear struts and other associated components for determining the load-related characteristics and aid in center of gravity calculations.

However, much of the various load limitations of the aircraft are known because the various characteristics of an individual aircraft are known, including certificate limits and other limits. Much of this information could be used to pre-plan the loading of an aircraft before physically loading the pallets to maintain the center of gravity.

SUMMARY OF THE INVENTION

In accordance with the present invention, a method of pre-planning the loading of an aircraft before physically loading pallets on the aircraft is disclosed. An identifier of a particular aircraft to be loaded is entered into a processor. A data file relating to the loading limitations for the particular identified aircraft to be loaded is retrieved from a database associated with the processor. Data is then entered regarding the amount of fuel, such as the weight upon departure. Data is entered for the weights of pallets to be loaded into pallet positions. A user selects a first option for calculating within the processor the optimum location of pallets in pallet positions to obtain the optimum center of gravity balance of the aircraft, or the user selects a second option for determining if the center of gravity of the aircraft based on the location of pallets and pallet positions are within the center of gravity limits of the aircraft.

A pallet loading configuration is loaded and displayed on a computer screen after calculating the optimum pallet positions when the first option is selected. It is possible to save the pallet loading configuration to a disk, which can then be transferred to a flight crew or ground crew. If the center of gravity of the aircraft based on the entered pallet positions are not within the center of gravity limits of the aircraft, then an error message can be displayed.

The supplemental type certificate limits for the aircraft to be loaded can be displayed on a computer screen. Fixed weights of pallet position that hold pallets can be assigned and not moved after initially entering weights for the pallets. Thus, it would not be possible to change the weights in those pallet positions for center of gravity calculations. This is especially applicable to having pallet positions that hold hazardous materials. The data file can store the V-speeds, engine pressure ratio, and data relating to supplemental types of certificate limits for the identified aircraft to be loaded.

In still another aspect of the present invention, the aircraft includes a cargo hold having a plurality of pallet positions and a lower compartment with lower compartment loading positions. Data of the load weights of the lower compartment loading positions is entered and as the data for each lower compartment weight is entered, the available weight for a lower compartment loading position is calculated within the processor. It is possible to display on a computer screen the Take-Off Gross Weight Center of Gravity (TOGW CG) and center of gravity limits as data of the load weights is entered to reach lower compartment loading positions.

BRIEF DESCRIPTION OF THE DRAWINGS

Other objects, features and advantages of the present invention will become apparent from the detailed description of the invention which follows, when considered in light of the accompanying drawings in which:

Figure 7:
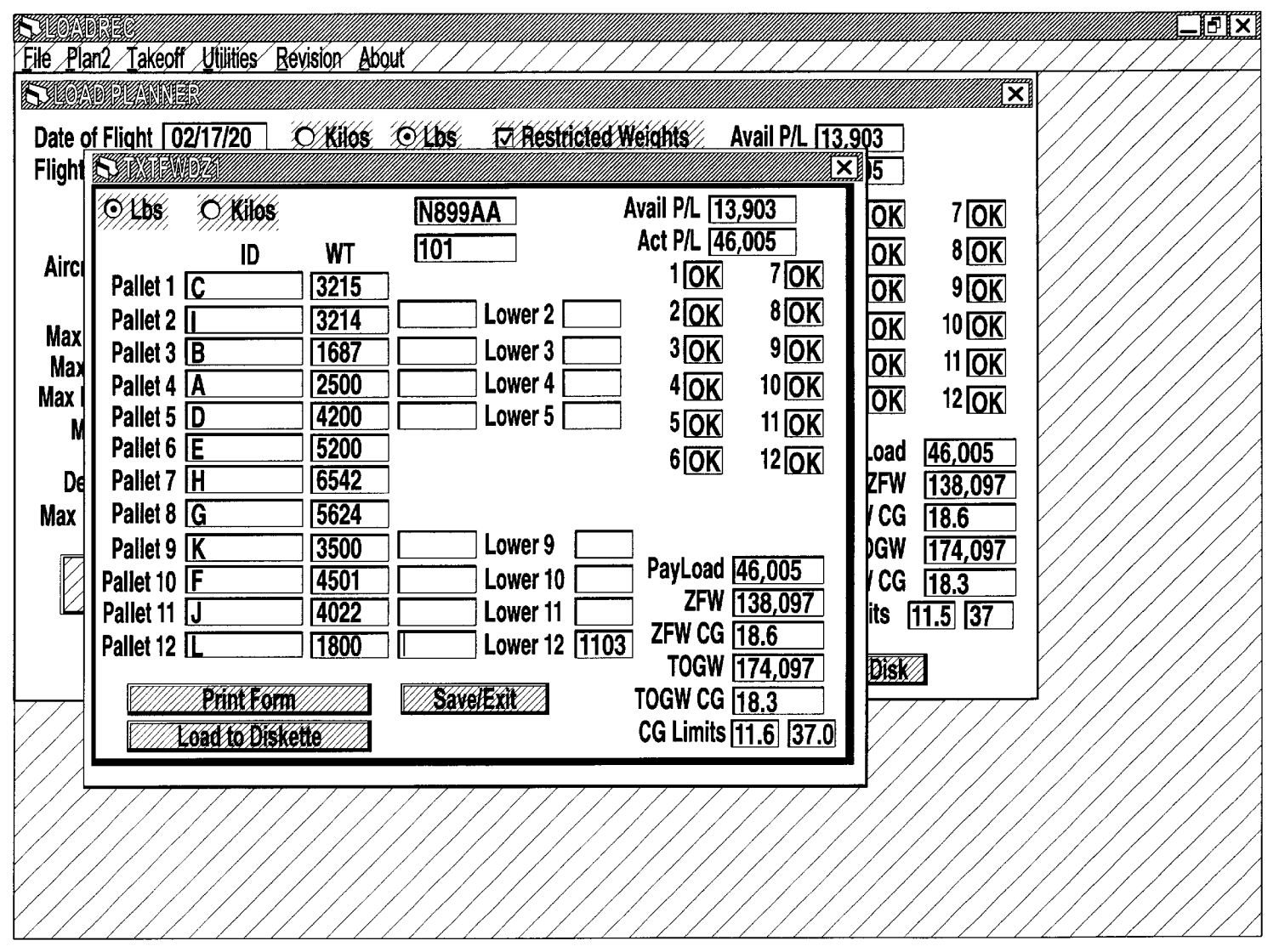

FIGS. 3–9 are illustrations of open windows showing screens with a graphical user interface having data entry boxes that can be used with the present invention.

FIG. 11 is a graph showing a cargo limitation for plane A1 and the maximum permissible position weight limits for upper and lower lobes for plane A1.

FIG. 12 is a reduced cargo load weight position limits table for plane A1.

FIG. 14 is another table similar to the table shown in FIG. 12 for plane B2.

DETAILED DESCRIPTION OF THE PREFERRED EMBODIMENTS

The present invention is designed to meet the cargo load pre-planning for the ground crew and the flight crew and allow rapid completion of the required load manifest and the take-off data, and accommodate the air worthiness directive (AD) that restricts the loading of aircraft.

When the ground crew uses the present invention, as an example, the load is stored on the hard drive in a loading or pallet configuration file. This file can be copied to a floppy disk and delivered to the ground and/or flight crew. The crew can copy and use the disk, thus eliminating the need to re-enter the data. This may not always be feasible, but the capability is there.

The present invention is also designed for use by the flight crew to complete the load manifest and take-off data card. The V-speeds and the engine pressure ratio (EPR) values are stored in the program, which accommodates reduced EPR, reduced EPR V-speeds, anti-ice EPR adjustments, and performance adjustments, such as the anti-skid inoperative and water/slush/snow on the runway.

With the present invention, the load limitations of each individual aircraft are stored in a data file that is accessed by aircraft number, which acts as an aircraft identifier for retrieving the data file within a database. The file contains all of the loading restrictions for the particular aircraft, i.e., pallet position limits, zone limits, reduced zero fuel weight limits and certificate limits. The present invention will process data and will not permit any of these limitations to be exceeded.

Figure 3:
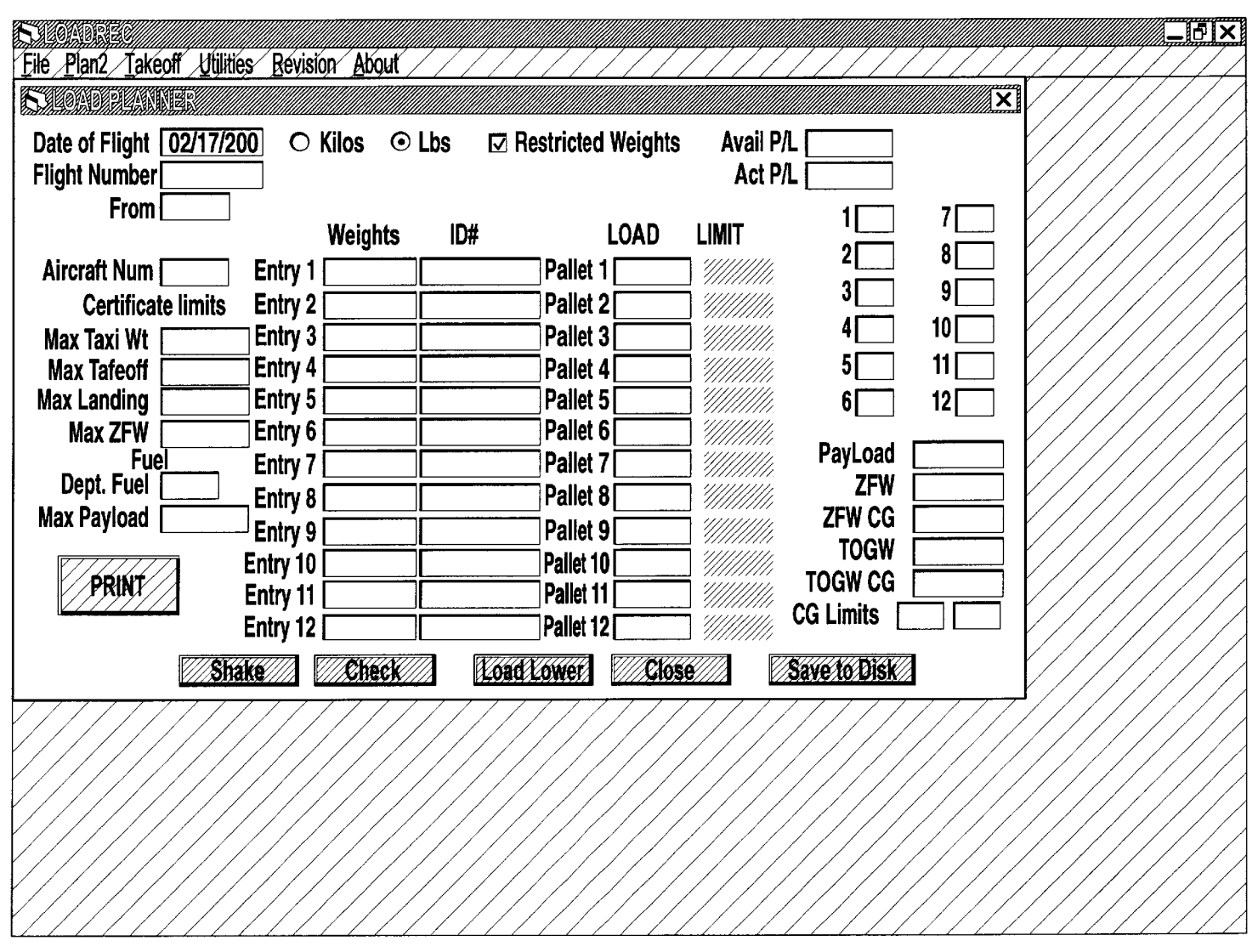

The method of the present invention correctly plans the loading of an aircraft before any pallets are physically loaded onto the aircraft. It is designed for use by the ground crew to pre-plan cargo loading while maintaining the center of gravity. New FAA loading limitations can be accounted for in the program. For example, in the open window of FIG. 3, illustrating the graphical user interface (GUI), the check-box labeled "Restricted Weights" at the top of FIG. 3 is checked. This box is checked by default and typically is never changed. This denotes that the new FAA restrictions have been considered.

Figure 1:
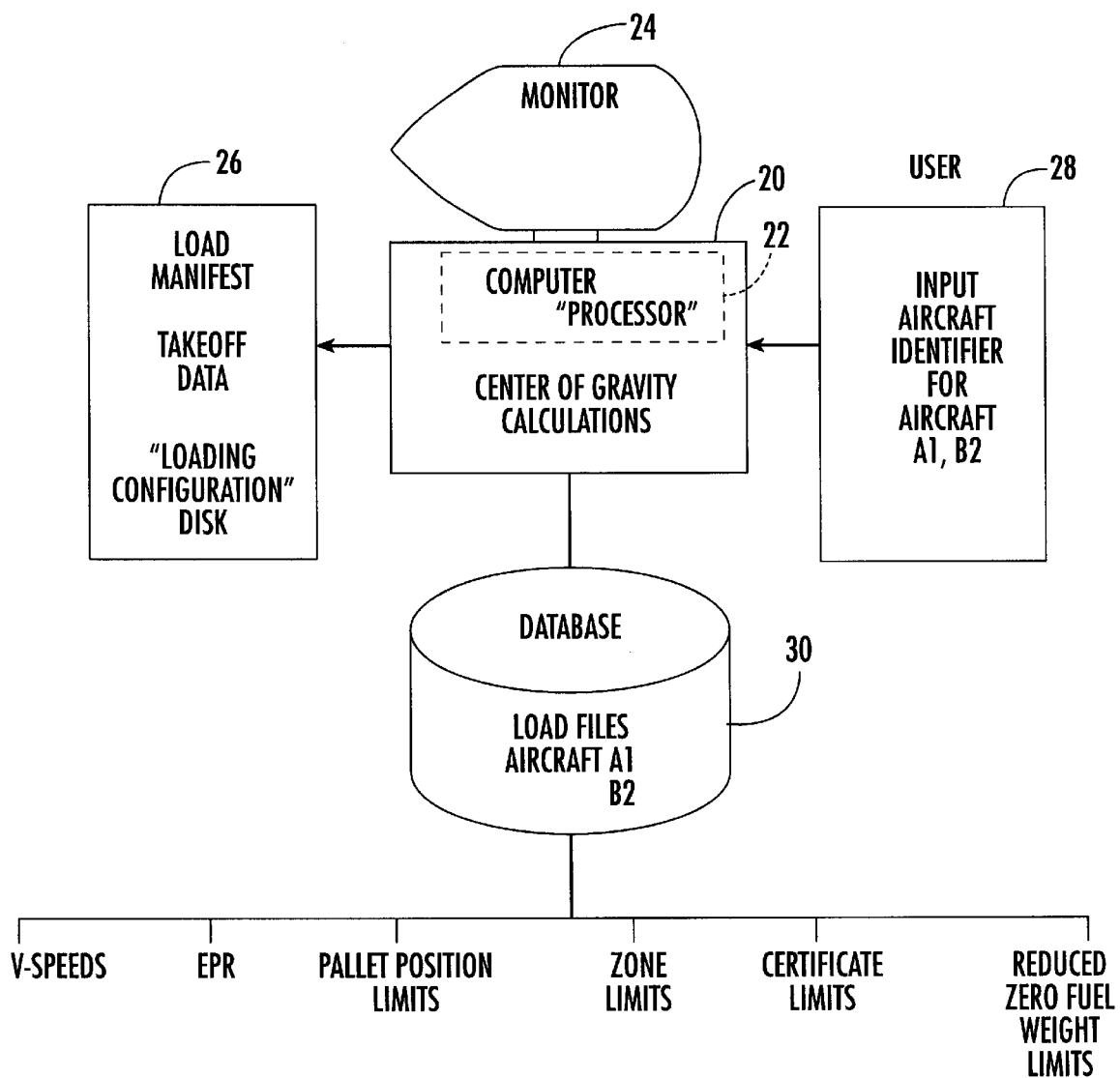
FIG. 1 is a block diagram showing the basic inputs into a computer processor and the various elements of a data file within the database associated with the computer processor.

Referring now to FIG. 1, there is shown a general block diagram of the system that is used for practicing the method of the present invention. A computer 20 includes a processor 22 that calculates center of gravity. A monitor 24 is connected to the computer and allows viewing of the graphical user interface and other screens by a user. The load manifest, take-off data card, and loading configuration shown generally at Block 26 are some of the outputs from the computer. The user inputs an aircraft identifier 28, such as an identifier for aircraft A1 or B1. A database 30 contains load files for aircraft A1 and aircraft B1, which are retrieved after the user inputs the identifier for that aircraft, such as A1. These identifiers could be the tail number of the aircraft. The database loading file includes data, such as V-speeds, EPR, pallet position limits, zone limits, certificate limits and reduced zero fuel weight limits.

As is known to those skilled in the art, the center of gravity is typically the mass-weighted average of component locations. Typically because the total weight of the aircraft is the sum of individual weight of components, such as the vertical and horizontal tails, the wings, engines, fuel, payloads, etc., it is possible to say that the weight of the entire aircraft times the location of the center of gravity is equal to the weight of each component times the distance of that component from the reference location. Each component has some weight $W_I$ located some distance $D_I$ from a reference line. The distance CG times the weight W equals the sum of the component distance times the weight.

The center of gravity calculation can be best described generally by:

$$cg\ W = D_f w_f + d_e w_e + d_w w_w + d_p w_p +$$

$$\text{Discrete}: cgW = \sum_{i}^{n} (wd)i$$

$$\textit{Differential}: cgW = \int xw(x)dx$$

The engine pressure ratio (EPR) is related to the total pressure within various portions of a powered gas turbine engine, i.e., the jet engine. As is known, air is brought into a turbo jet through an inlet and at the rear of the inlet, the air enters a compressor having rows of air foils producing a small increase in pressure. At the compressor exit, the higher pressure air enters the burner where a small amount of fuel is combined with the air and ignited at constant pressure. This hot exhaust is passed through the turbine and energy is extracted from the flow by the turbine to turn the compressor that is linked to the turbine by a central shaft. As pressure is lost in the hot exhaust during the process, the pressure entering the nozzle is still greater than free steam and the nozzle converts to high pressure and temperature in the high velocity. Because the exit velocity is greater than the pre-stream velocity, the thrust is created.

The engine pressure ratio is, thus, the total pressure ratio across the engine. The EPR is the ratio of a nozzle total pressure (PT8) to a compressor face total pressure (PT2). It is best illustrated by the following formula:

$$EPR = \frac{pt_8}{pt_2} = \underbrace{\frac{pt_3}{pt_2}}_{compressor} \underbrace{\frac{pt_4}{pt_3}}_{burner} \underbrace{\frac{pt_5}{pt_4}}_{turbine} \underbrace{\frac{pt_8}{pt_5}}_{nozzle}$$

The V-speeds are varied depending on the type of aircraft. An example of various V-speeds are listed below:

| V SPEEDS TABLE | |
|---|---|
| Va | Design maneuvering speed |
| Vb | Design speed for maximum gust intensity |
| Vc | Design cruising speed |
| Vd | Design diving speed |
| Vdf/Mdf | Demonstrated flight diving speed |
| Vf | Design flap speed |
| Vfc/Mfc | Maximum speed for stability characteristics |
| Vfe | Maximum flaps extended speed |
| Vh | Maximum speed in level flight with maximum continuous power |
| Vle | Maximum landing gear extended speed |
| Vlo | Maximum landing gear operating speed |
| Vlof | Lift-off speed |
| Vmax | Maximum speed |
| Vmbe | Maximum brake energy speed |
| Vmc | Minimum control speed |
| Vmca | Minimum control speed airborne |
| Vmcg | Minimum control speed ground |
| Vmin | Minimum speed |
| Vmo Mmo | Maximum operating limit speed |
| Vmu | Minimum unstick speed |
| Vne | Never exceed speed |
| Vno | Maximum structural cruising speed |
| Vr | Rotation speed |
| Vref | Reference speed |
| Vs | Stalling speed |
| Vso | Stalling speed in the landing configuration |
| Vsl | Stalling speed in a specified configuration |
| Vtd | Touchdown indicated airspeed |
| Vtoss | Take-off safety speed for Category A rotocraft |
| Vx | Speed for best angle of climb |
| Vy | Speed for best rate of climb |

-continued

V SPEEDS TABLE

| | |
|---|---|
| V1 | Take-off decision speed |
| V2 | Take-off safety speed |
| V2min | Minimum rake-off safety speed |

Figure 2:
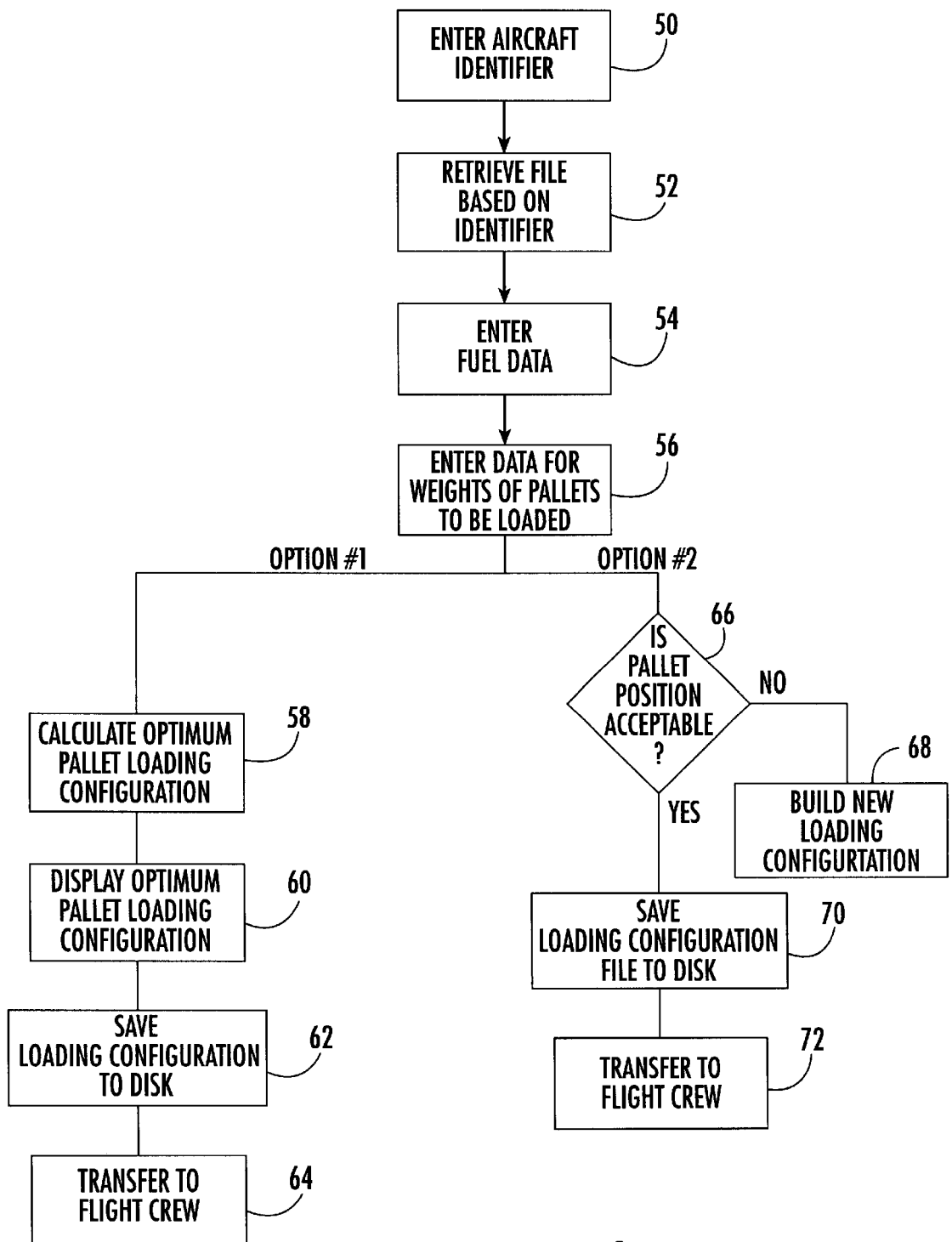
FIG. 2 is a basic flow chart illustrating the sequence of steps of the present invention.

Referring now to FIG. 2, there is illustrated a basic flow chart for the overall method of the present invention. As shown in FIG. 2, an identifier for the aircraft is entered into the computer processor (Block 50). This identifier is typically the tail number of the aircraft. A loading file is retrieved from a database based on the identifier that had been previously entered (Block 52). This file has the different data components as shown in FIG. 1 and described above. Fuel data, such as the fuel weight upon departure, is entered by the user into the computer processor (Block 54). Also, data for the weights of pallets to be loaded is entered in the computer processor (Block 56). This is typically a sequential listing of a proposed pallet positioning. At this time, the user can choose option 1 or option 2 by clicking an appropriate button on the graphical user interface screen as described below. If option 1 is selected, then the optimum pallet loading configuration is calculated (Block 58) and displayed on a computer screen where different pallets are rearranged based on the calculations (Block 60). This loading configuration is saved to a disk (Block 62) and then transferred to the ground crew and/or flight crew (Block 64). If option 2 is selected, then the processor makes a determination whether the original pallet positioning is acceptable (Block 66). If it is not, then the user must rearrange the pallets within the pallet position in a different order (Block 68). If the pallet positioning is acceptable, then the configuration is saved on a disk (Block 70) and transferred to the ground and/or flight crew (Block 72).

FIGS. 3–9 illustrate one example of a type of open computer display window on screen with graphical user interface that can be used with the present invention. Although it illustrates various components and data entry boxes, it is only one typical example of the various components that can be used.

As shown in FIG. 3, the screen having the open window includes such data entry items as the date of flight, flight number to and from, aircraft number, various certificate limits, such as the various taxi weights at take-off and landing, fuel information and various pallet entry weights and ID number, as well as load limits. To the lower right are data display boxes for the payload and various center of gravity data numbers that are exhibited as the processor of the computer makes its calculations.

There will now be explained a brief explanation of the use of the invention relative to the illustrated open windows and graphical user interface, as displayed. Naturally the description is only one example and different methods relative to the graphical user interface and other screens can be designed as known to those skilled in the art. The description follows with the various data entry items listed with a brief description of what information is added into the data entry boxes. Starting with FIG. 3, the following data entry boxes and other components are described.

Date of Flight—A user first enters the date of the flight, making sure that it is the correct Zulu date, example: Feb. 22, 2000.

Flight Number—The flight number is entered and may be any combination of alpha/numeric characters. It is mandatory that something be entered.

From—The user enters the three-digit alpha code for the departure station. The departure stations should match exactly in many instances. The program can be established such that the weights stored in the load file of data will not transfer if the station codes and aircraft number do not match exactly.

Aircraft Num—The user enters the three-digit identification number for the aircraft. The program can retrieve the loading limitations for that aircraft. The program can be established so that if the identification number is not found, there will be a beep and the cursor will return to the cell for another try. A valid aircraft number corresponding to a database file must be entered in order to proceed.

Certificate Limits—The certificate limits are automatically displayed when an aircraft number is entered. Once entered, the cursor will move to the Dept. Fuel entry cell.

Dept. Fuel—This entry should be exact because it is used by the processor for the computation of final weights and center of gravity for take-off. The user should consider that if the captain orders more fuel than scheduled, the captain may push the center of gravity too far forward.

Figure 4:
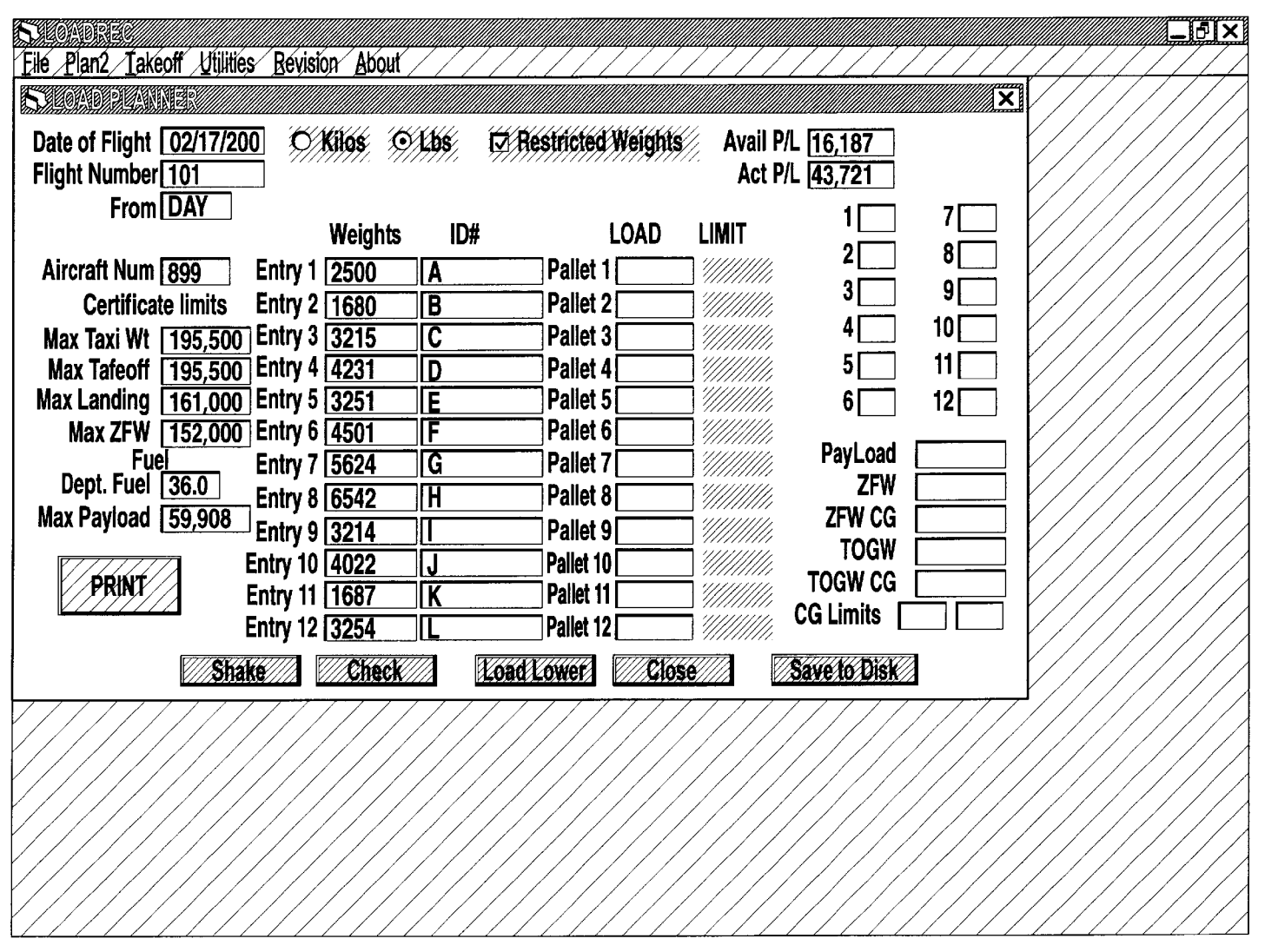

Pallet Weights—The pallet weights may be entered in any order such as shown on the display screen of FIG. 4. The pallet ID numbers as illustrated are alphabetic for demonstration purposes. These pallet ID's may include a pallet destination after the number by using a /., PLT237667/SFO.

At this point, a user selects (by using a mouse click) either the button labeled "Shake" or "Check" to perform calculations. Shake will automatically move the weights to the optimum positions for balance. Check will not move weights, but will allow the user to determine if the load as it is entered is within the center of gravity limits. Processing techniques, as known to those skilled in the art, can be used.

Figure 5:
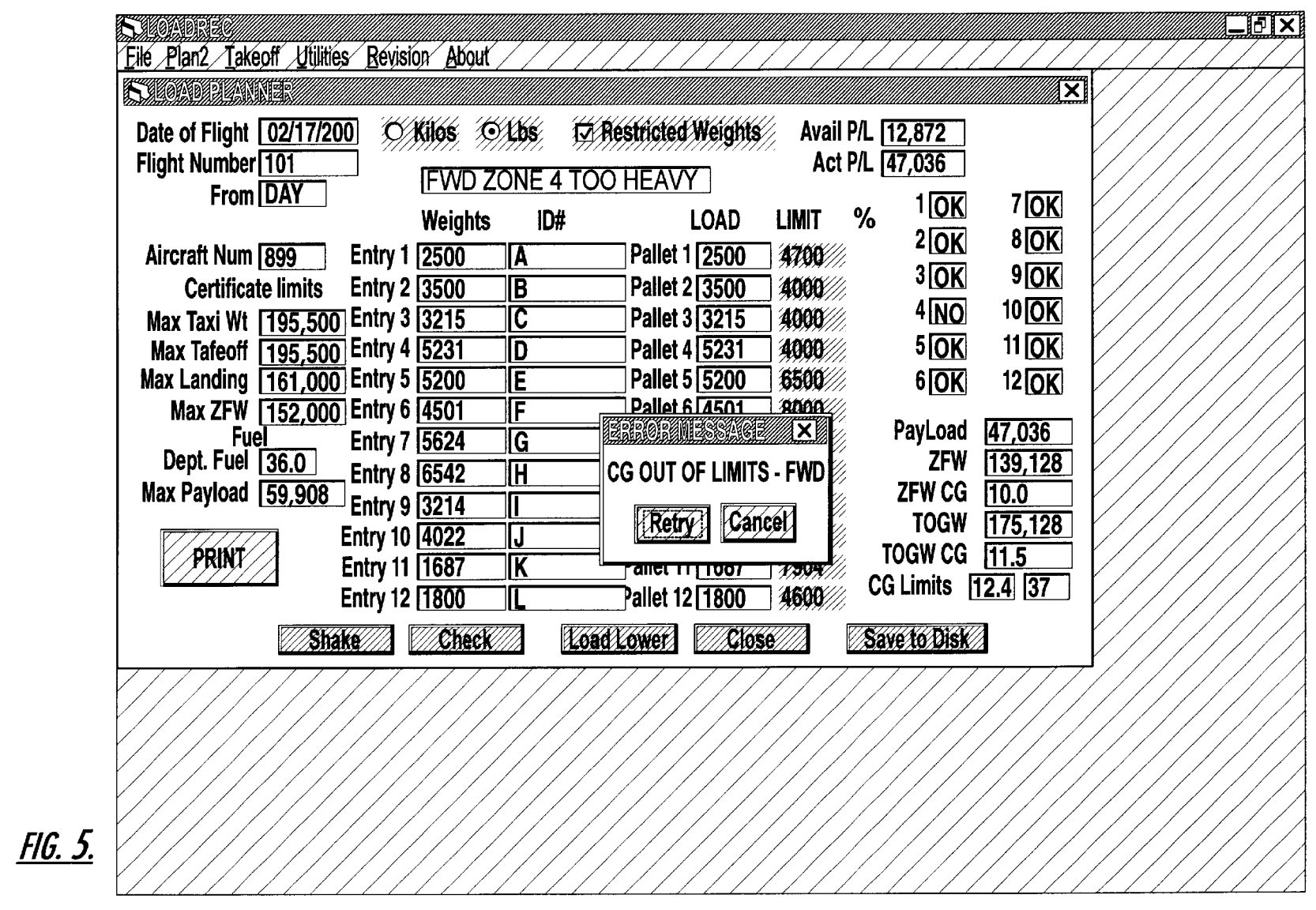

If "Check" is chosen, the screen display will tell the user if the center of gravity is within the center of gravity limits. For example, as shown in FIG. 5, an error message has been displayed. This error message states that this loading is out of center of gravity forward. The weights and positions can be rearranged at this point and checked again. This can be done by the user as many times as necessary. This function may be used if multiple positions must be locked in for downline consideration or anytime a certain loading is preferred.

The reduced zero fuel weights are displayed next to the LOAD column. The percentage of reduction is displayed at the top of the column. The cumulative zone limits are displayed to the right of the screen. If the zones are within limits, the word "OK" is displayed. If a zone limit is exceeded, it will display NO and an error message will appear, or both. The incorrect entry must be corrected to proceed further.

The other option a user can select is "Shake." Shake allows the processor to rearrange the pallets into an optimum loading configuration. Check and Shake cannot both be used on the same load calculation. If the user determines that Shake is needed after Check has been used, the user must close the program and start over.

Figure 6:
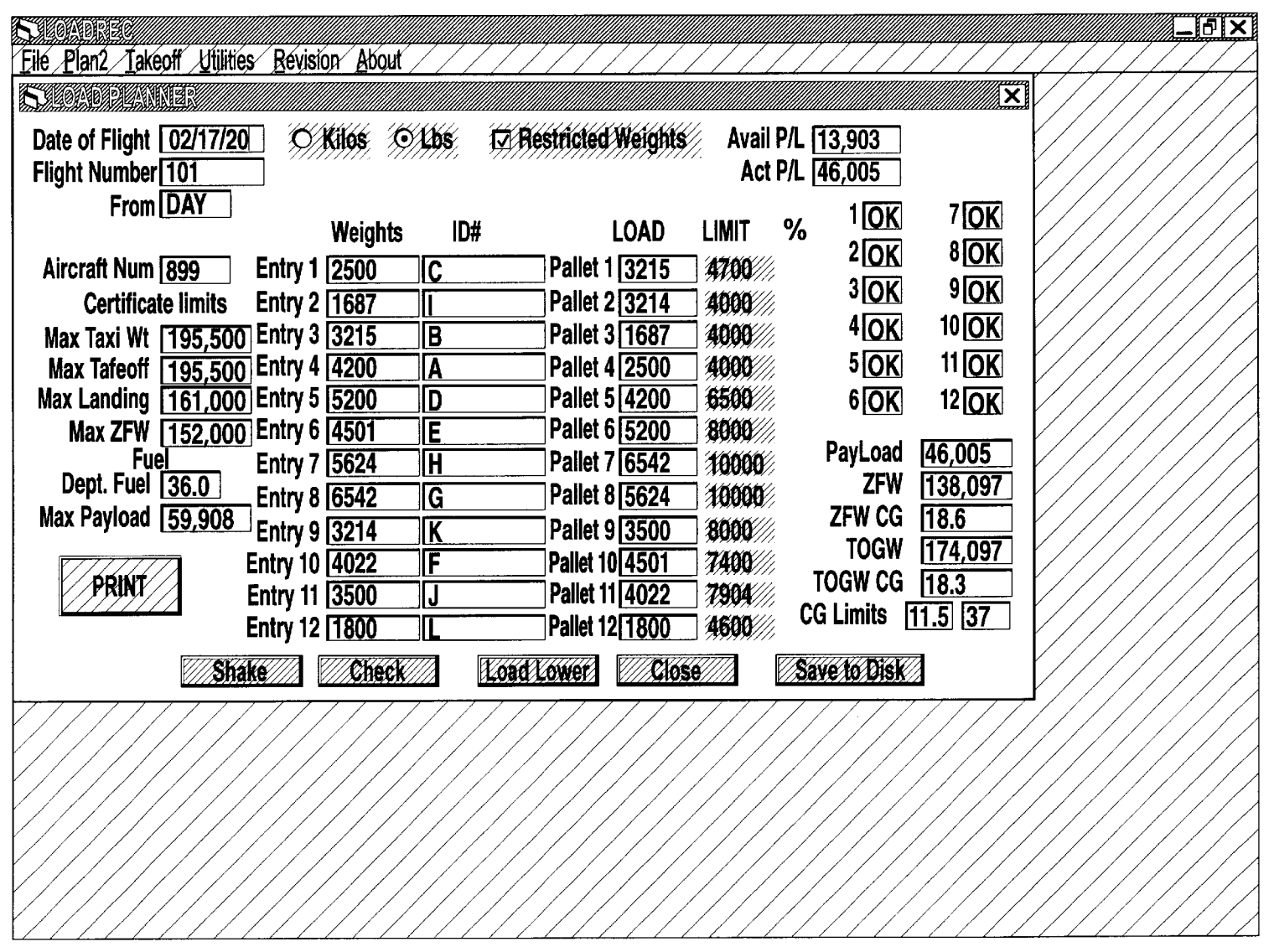

Once Shake is pressed, the load computations are completed. The pallet loading is displayed, all aircraft limitations are verified, and the take-off information is displayed as shown in FIG. 6. To make any changes after Shake has been selected, a user must exit the program and start over.

If any limitation is exceeded, there will be a red "NO" in a box, an error message will appear, or both. In the GUI screen of FIG. 6, the pallets have been properly arranged and the center of gravity is within limits. If the center of gravity is out of limits, there is no way to re-do the screen, and it will be necessary to reload the aircraft with different pallet weights. At the lower portion of a screen, a "Load Lower" button is seen between the "Check" and "Close" buttons. The "Load Lower" button can be now highlighted at that time. When ENTER is pressed, a LOAD BELLY screen will appear (FIG. 7), which allows loading of a lower compartment having a plurality of lower compartment loading positions.

The user moves the cursor and begins in the "Lower #12" cell. The cursors will then move forward as ENTER is pressed. The weight and center of gravity will be recomputed after each entry. To the right of the "Lower #12" label, there is a cell with a red number on it. This cell displays the maximum pounds that may be loaded in the lower section without exceeding the FAA loading limit. These limits are also adjusted for reduced zero fuel weights.

As each lower compartment is loaded, the program recalculates the available weight for the next compartment, and it is displayed in "red." As the lower sections are loaded, the user monitors the "TOGW CG" and the "CG Limits" boxes. Most of the lower cargo must be loaded forward and the center of gravity can easily exceed the forward limit. If the limit is exceeded, it may be removed and recalculated. Also, as the weight increases, the forward center of gravity limit on some aircraft moves aft creating more limited loading.

The user should strive to leave at least a 3–4% margin between the TOGW CG and the forward limit as an allowance for extra crew and fuel. When the load is satisfactory, the user clicks on the "Print Form," "Load to Disk" or "Save/Exit" button. Print Form will print the load plan, i.e., loading configuration, to be taken to the flight crew for manual entry. If the flight crew is able to accept the load plan in the form of a floppy disk, the user places a disk in the disk drive and click on load to disk. The disk may then be given to the flight crew to download. If the user wishes to finalize the session, the user clicks on the save/exit button. This will also transfer the data to the TAKEOFF function when it is used.

The program can also accommodate fixed pallet positions, e.g., three positions, for use with hazardous materials (HAZMAT) or other purposes. For example, these could be pallet position #1, #2 and/or #3. Fixed pallets will never be moved to change the center of gravity. To assign a fixed pallet, using the mouse, the user puts the cursor in the pallet #1, #2 or #3 ID# cell. The user enters the pallet number and presses enter. The user enters the fixed weight in the load column. The user presses the enter key after every entry. If required, the user uses the mouse to place the cursor in the next position. To void position #3 when only 11 positions are required, the user places the cursor in the ID# column position #3 and enters something for an ID#. The word VOID can be used. The user presses the enter key and enters a single digit in the load column (1–9, do not use 0). The user presses enter and continues.

Figure 8:
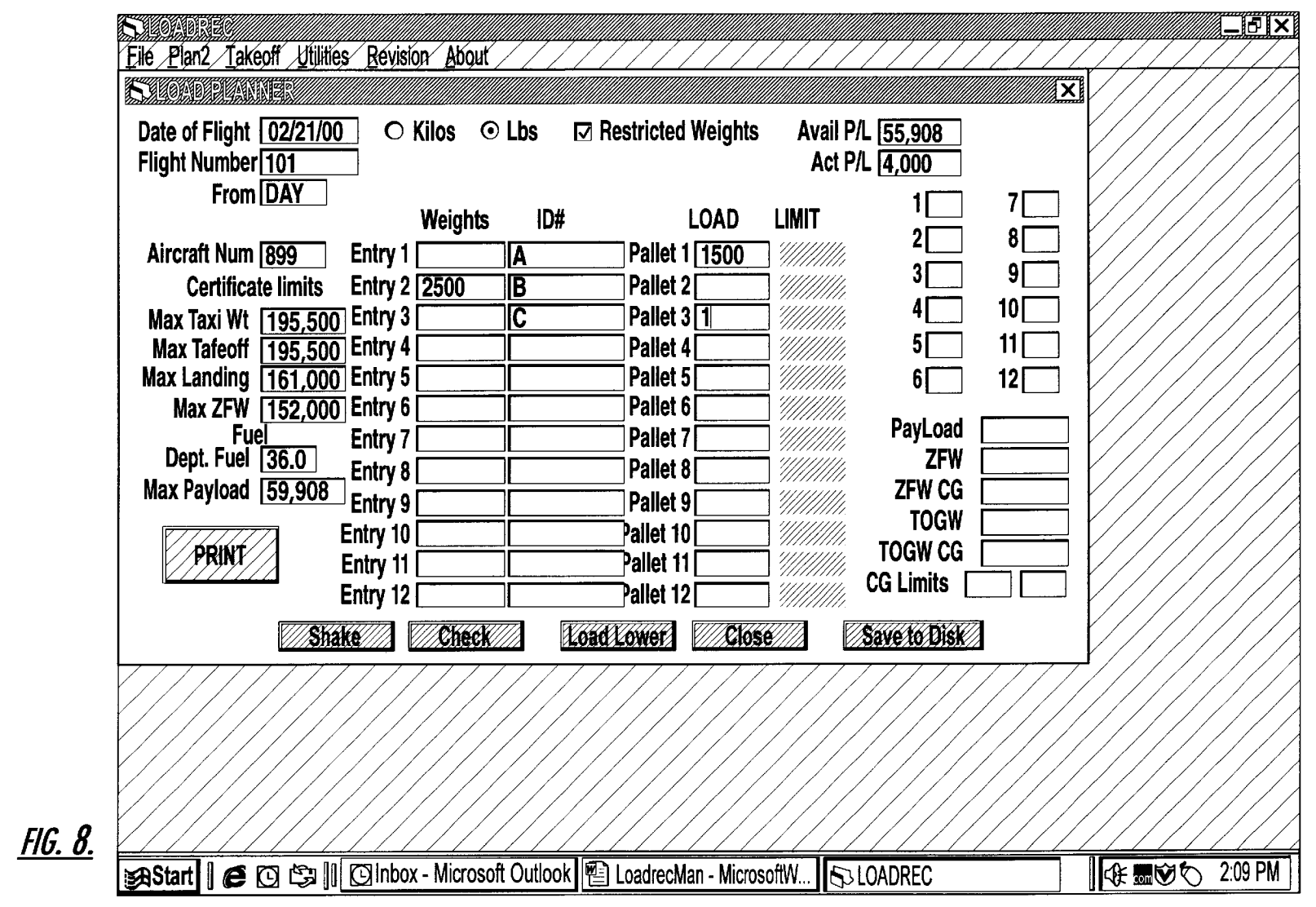

On the screen shown in FIG. 8, #1 and #3 have been loaded as fixed pallets. After #3 is entered, the cursor will move to the entry #4 cell, and then continue with the rest of the pallets.

Figure 9:
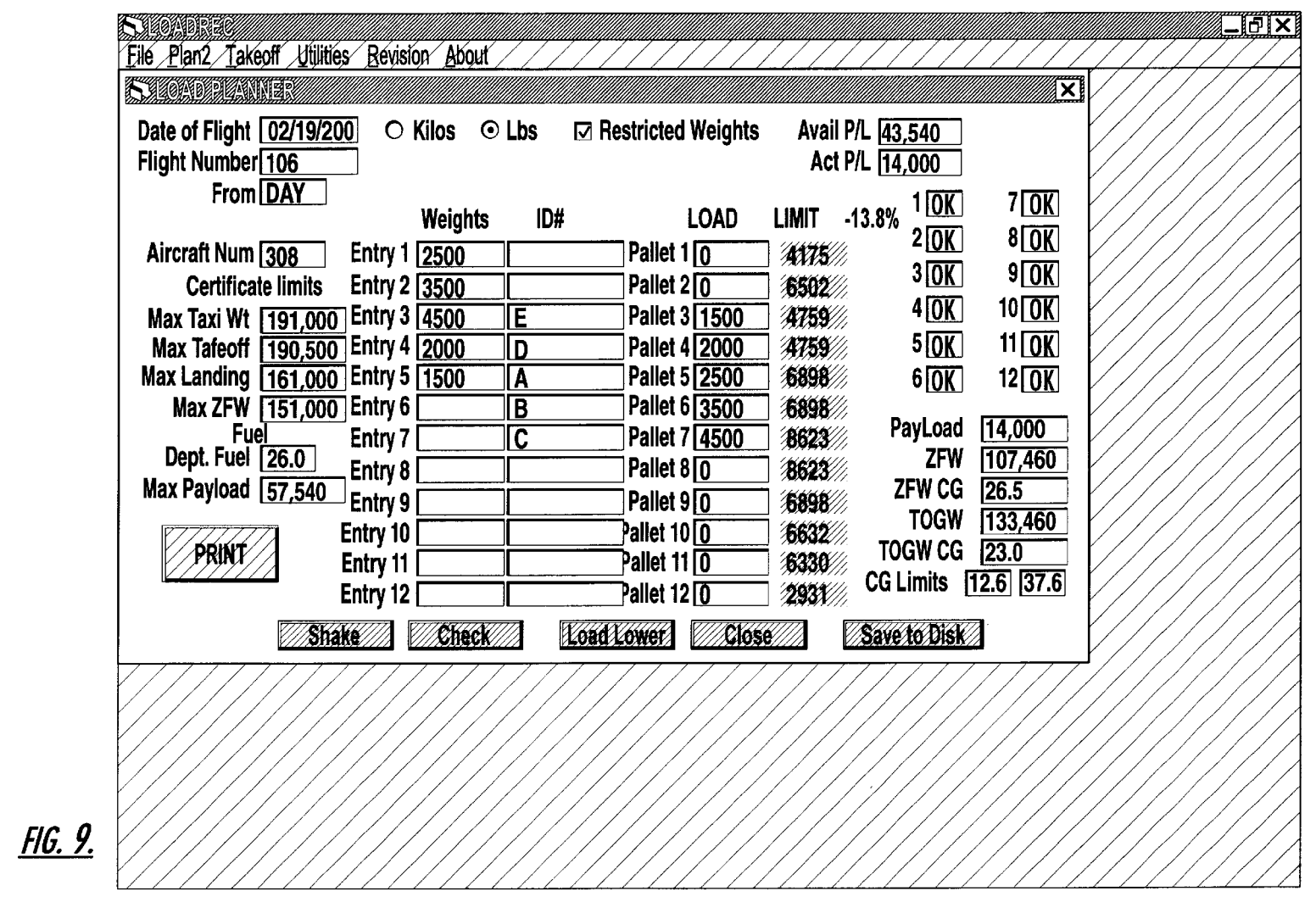

The method and program of the present invention will also accommodate a "less than a full" load of pallets. When loading less than full, the TOGW center of gravity will be much further aft than what is normally seen. The program will also try to keep the center of gravity as far aft as possible. Therefore, with only a few pallets, the center of gravity may show 24% or more. The further aft, the more fuel efficient (FIG. 9).

Below is an example of the weights and STC limitations concerning representative aircraft:

| A/C Tail Number | Aircraft BOW | Maximum Payload |
| --- | --- | --- |
| N12BNA | 94,157 | 52,000 |
| N227JL | 92,605 | 52,000 |
| N1279E | 93,969 | 52,000 |
| N357KP | 94,155 | 46,900 |
| N808EA | 93,052 | 52,000 |
| N308AS | 93,460 | 52,000 |
| M898AA | 92,513 | 52,000 |
| N899AA | 92,092 | 52,000 |
| N84357 | 93,955 | 46,100 |

All weights in pounds.

Figure 10A:
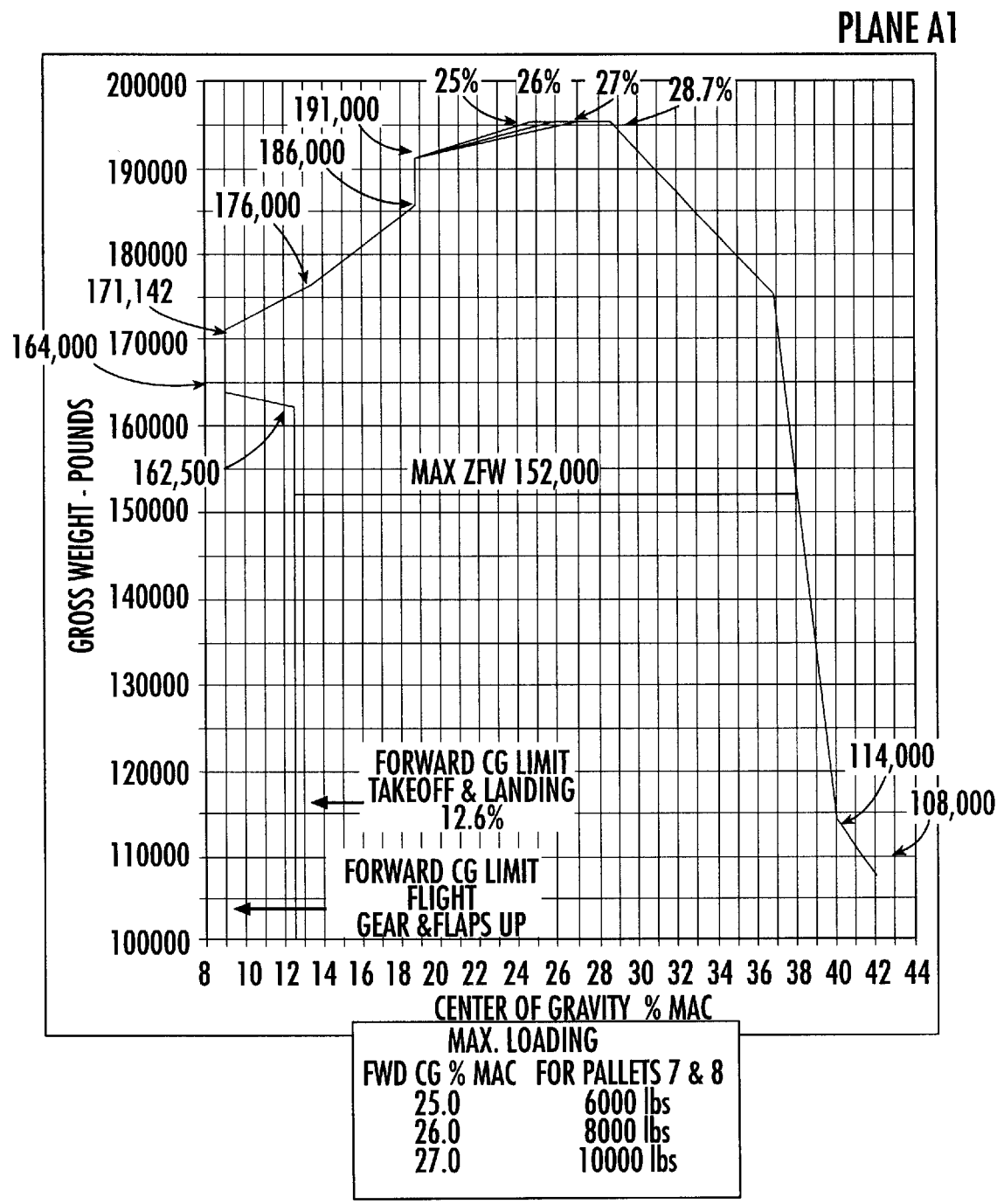
FIGS. 10A and 10B are graphs showing center of gravity limitations as part of STC limitations for two representative planes, A1 and B2.
Figure 10B:
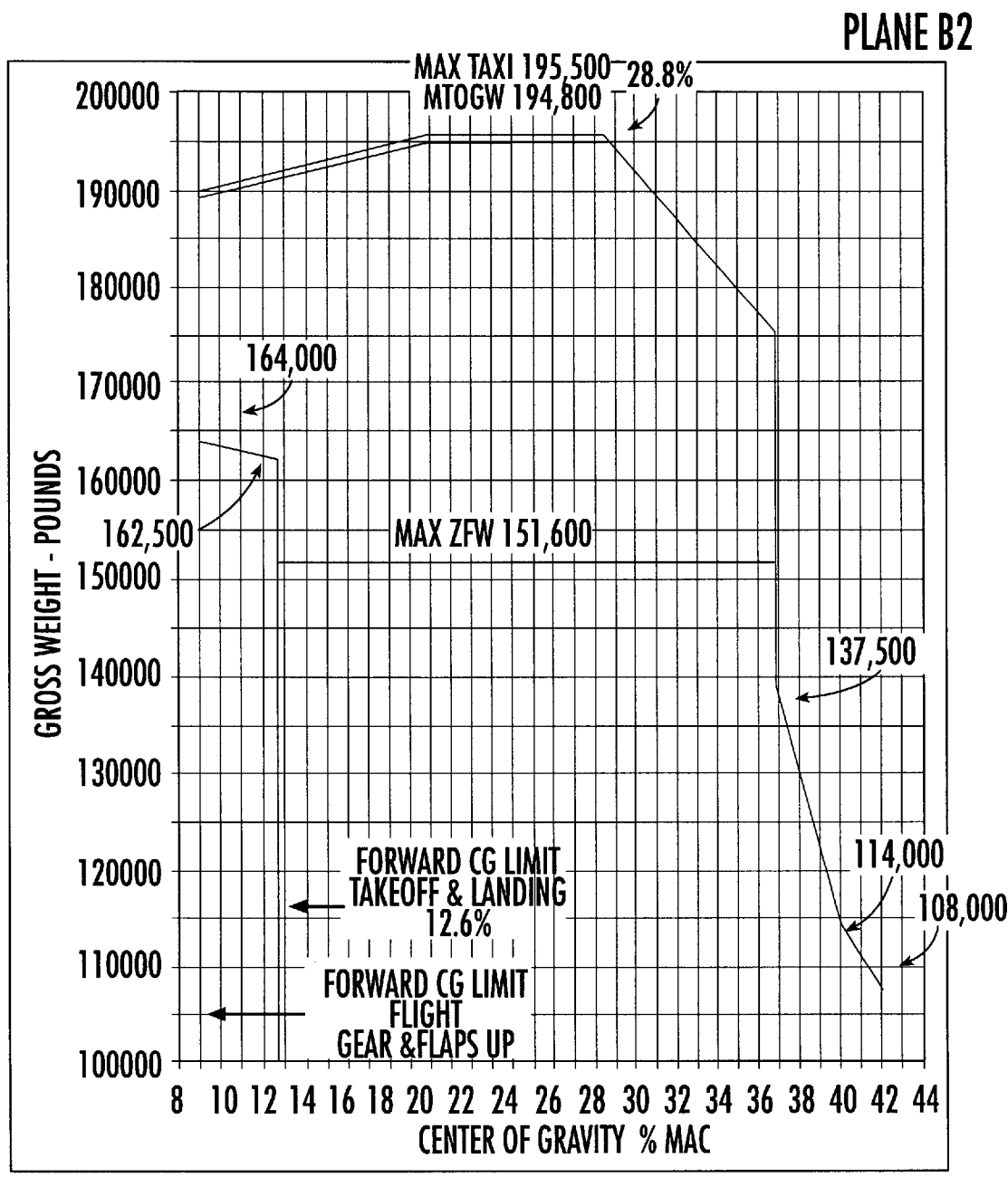
Figure 13:
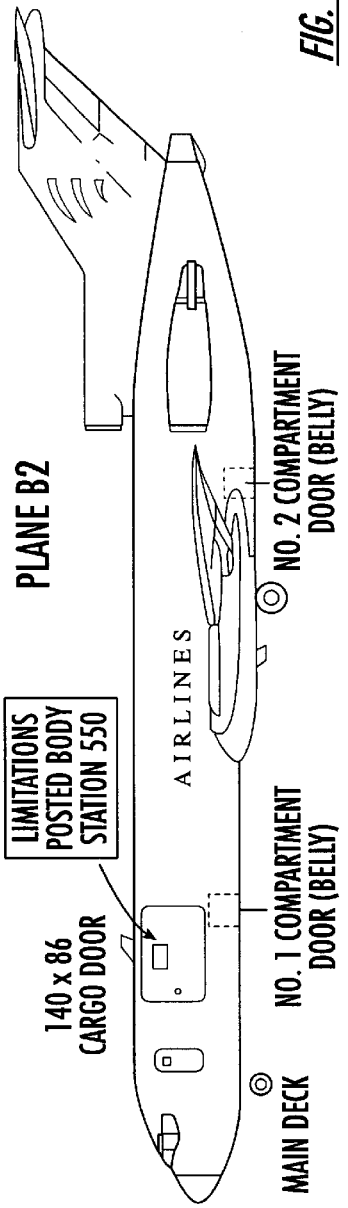
FIG. 13 is another table and graph similar to FIG. 11 for plane B2.

FIGS. 10A, 10B, 11, 12, 13 and 14 include examples of (1) center of gravity limitations; (2) STC limitations for group of aircraft; and (3) reduced zero fuel weight position limits (by cargo weights) for each aircraft. The figures show the data regarding two aircraft labeled plane A1 and plane B2. Center of gravity limitations for plane B2 are shown in FIGS. 10A and 10B. FIGS. 11 and 13 show loading limitations for planes A1 and B2 with the type of graphical user interface representation that could be displayed for an aircraft with the 12 pallet positions and showing a table of the maximum permissible position weight limits for upper and lower lobes where weights are listed in U.S. pounds. Although these are only examples, they give an idea of the type of data that are used. The table lists position limitations for all zero fuel weights from 135,000 pounds to 152,000 pounds. For zero fuel weights that are less than 135,000 pounds, the position limit weight should be reduced by 1% for each 2,000 pounds that zero fuel weight is below 135,00 pounds. Limitations may be derived from the reduced zero fuel weight tables in an aircraft specific chapter of weight and balance operations procedures manual such as for the B-727 when the aircraft is a B-727 as in the example above.

FIGS. 12 and 14 are tables for the reduced cargo load weight position of a table with appropriate data. The limits in this table are more restrictive than the requirements of the STC. These weights ensure position weight limitation compliance when operation at zero fuel weight below these converted to cargo weights. To obtain the specialty calculated weight reduction, which will provide equally or higher limits, the formula of 1% for each 2,000 pound reduction below the total cargo weight in pounds shown in the upper right column must be applied to each position limitation.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of pre-planning the loading of aircraft before physically loading pallets on the aircraft comprising the steps of:

entering into a processor an identifier of an aircraft to be loaded;

based on the identifier, retrieving from a database associated with the processor, a data file relating to the loading limitations for the identified aircraft to be loaded;

entering data regarding the amount of fuel upon departure;

entering data for the weights of pallets to be loaded into pallet positions; and user selecting a first option for calculating within the processor the optimum location of pallets in pallet positions to obtain the optimum center of gravity balance of the aircraft or user selecting a second option for determining if the center of gravity of the aircraft based on the entered location of pallets in pallet positions are within center of gravity limits established for the aircraft.

2. A method according to claim 1, and further comprising the step of displaying on a computer screen a pallet loading configuration after calculating optimum pallet positions.

3. A method according to claim 1, and further comprising the step of saving a pallet loading configuration to a disk.

4. A method according to claim 1, and further comprising the step of displaying an error message if a calculated center of gravity of the aircraft based on the entered pallet positions of pallets are not within center of gravity limits established for the aircraft.

5. A method according to claim 1, and further comprising the step of displaying on a computer screen any supplemental type certificate limits established for the aircraft to be loaded.

6. A method according to claim 1, and further comprising the step of assigning fixed weights of pallet positions that hold pallets and are never moved after initially entering weights for the pallets.

7. A method according to claim 1, and further comprising the step of storing within the data file V-speeds, engine pressure ratio, and data relating to supplemental type certificate limits established for the aircraft to be loaded.

8. A method of pre-planning the loading of aircraft before physically loading pallets on the aircraft, wherein the aircraft includes a cargo hold having a plurality of pallet positions, and a lower compartment having a plurality of lower compartment loading positions, comprising the steps of:

entering into a processor an identifier of an aircraft to be loaded;

based on the identifier, retrieving from a database associated with the processor, a data file relating to the loading limitations for the identified aircraft to be loaded;

entering data regarding the amount of fuel upon departure;

entering data for the weights of pallets to be loaded into pallet positions;

user selecting a first option for calculating within the processor the optimum location of pallets in pallet positions to obtain the optimum center of gravity balance of the aircraft or user selecting a second option for determining if the center of gravity of the aircraft based on the entered weights of pallets in pallet positions are within center of gravity limits established for the aircraft; and entering data of the load weights of the lower compartment loading positions, and as data for each lower compartment weight is entered, calculating the available weight for a next lower compartment loading position.

9. A method according to claim 8, and further comprising the step of displaying on a computer screen Take Off Gross Weight Center of Gravity (TOGW CG) and Center of Gravity Limits as data of the load weights is entered for each lower compartment loading position.

10. A method according to claim 8, and further comprising the step of displaying on a computer screen a pallet loading configuration after calculating an optimum pallet position.

11. A method according to claim 8, and further comprising the step of displaying an error message if calculated center of gravity of the aircraft based on the entered pallet positions of pallets are not within center of gravity limits established for the aircraft.

12. A method according to claim 8, and further comprising the step of assigning fixed weights in pallet positions that hold pallets and are never moved after initially entering weights for the pallets.

13. A method according to claim 8, and further comprising the step of displaying on a computer screen any supplemental type certificate limits established for the aircraft to be loaded.

14. A method according to claim 8, and further comprising the step of saving a pallet loading configuration to a disk.

15. A method according to claim 8, and further comprising the step of storing within the data file V-speeds, engine pressure ratio, and data relating to supplemental type certificate limits for the aircraft to be loaded.

16. A method of pre-planning the loading of aircraft before physically loading pallets on the aircraft comprising the steps of:

entering into a processor an identifier of an aircraft to be loaded;

based on the identifier, retrieving from a database associated with the processor, a data file relating to the loading limitations for the identified aircraft to be loaded;

entering data regarding the amount of fuel upon departure;

entering data for the weights of pallets to be loaded into pallet positions; and calculating within the processor the optimum location of pallets in pallet positions to obtain an optimum center of gravity balance of the aircraft.

17. A method according to claim 16, and further comprising the step of displaying on a computer screen a pallet loading configuration.

18. A method according to claim 16, and further comprising the step of displaying on a computer screen any supplemental type certificate limits established for the aircraft to be loaded.

19. A method according to claim 16, and further comprising the step of saving a pallet loading configuration to a disk.

20. A method according to claim 16, and further comprising the step of assigning fixed weights of pallet positions that hold pallets and are never moved after initially entering weights for the pallets.

21. A method according to claim 16, and further comprising the step of storing within the data file V-speeds, engine pressure ratio, and data relating to supplemental type certificate limits for the aircraft to be loaded.

22. A method of pre-planning the loading of aircraft before physically loading pallets on the aircraft comprising the steps of:

entering into a processor an identifier of an aircraft to be loaded;

based on the identifier, retrieving from a database associated with the processor, a data file relating to the loading limitations for the identified aircraft to be loaded;

entering data regarding the amount of fuel upon departure;

entering data for the weights of pallets to be loaded into pallet positions; and determining if the center of gravity of the aircraft based on the entered weights of pallets at pallet positions are within center of gravity limits established for the aircraft.

23. A method according to claim 22, and further comprising the step of displaying an error message if a calculated center of gravity of the aircraft based on the entered pallet positions of pallets are not within center of gravity limits established for the aircraft.

24. A method according to claim 22, and further comprising the step of saving a pallet loading configuration to a disk.

25. A method according to claim 22, and further comprising the step of displaying on a computer screen any supplemental type certificate limits established for the aircraft to be loaded.

26. A method according to claim 22, and further comprising of assigning fixed weights of pallet positions that hold pallets and are never moved after initially entering weights for the pallets.

27. A method of pre-planning the loading of aircraft before physically loading pallets on the aircraft, wherein the aircraft includes a cargo hold having a plurality of pallet positions, and a lower compartment having a plurality of lower compartment loading positions, comprising the steps of:

entering into a processor an identifier of an aircraft to be loaded;

based on the identifier, retrieving from a database associated with the processor, a data file relating to the loading limitations for the identified aircraft to be loaded;

entering into the processor data regarding the amount of fuel upon departure;

entering data for the weights of pallets to be loaded into pallet positions;

calculating within the processor the optimum location of pallets in pallet positions to obtain the optimum center of gravity balance of the aircraft; and entering data of the load weights of the lower compartment loading positions, and as weight data for each lower compartment loading position is entered, calculating the available weight for a next lower compartment loading position.

28. A method according to claim 27, and further comprising the step of displaying on a computer screen Take Off Gross Weight Center of Gravity (TOGW CG) and Center of Gravity Limits as data of the load weights is entered for each lower compartment loading position.

29. A method according to claim 27, and further comprising the step of storing within the data file V-speeds, engine pressure ratio, and data relating to supplemental type certificate limits for the aircraft to be loaded.

30. A method of pre-planning the loading of aircraft before physically loading pallets on the aircraft, wherein the aircraft includes a cargo hold having a plurality of pallet positions, and a lower compartment having a plurality of lower compartment loading positions, comprising the steps of:

entering into a processor an identifier of an aircraft to be loaded;

based on the identifier, retrieving from a database associated with the processor, a data file relating to the loading limitations for the identified aircraft to be loaded;

entering into the processor data regarding the amount of fuel upon departure;

entering data for the weights of pallets to be loaded into pallet positions;

determining if the center of gravity of the aircraft based on the entered locations of pallets in pallet positions are within center of gravity limits established for the aircraft; and entering data of the load weights of the lower compartment loading positions, and as data for each lower compartment loading position is entered, calculating the available weight for a next compartment loading position.

31. A method according to claim 30, and further comprising the step of displaying on a computer screen Take Off Gross Weight Center of Gravity (TOGW CG) and Center of Gravity Limits as data of the load weights is entered for each lower compartment loading position.

32. A method according to claim 30, and further comprising the step of storing within the data file V-speeds, engine pressure ratio, and data relating to supplemental type certificate limits for the aircraft to be loaded.

* * * * *

UNITED STATES PATENT AND TRADEMARK OFFICE
CERTIFICATE OF CORRECTION

PATENT NO.    : 6,308,131 B1
DATED         : October 23, 2001
INVENTOR(S)   : Fox It is certified that error appears in the above-identified patent and that said Letters Patent is hereby corrected as shown below:

Column 5,
Line 7, delete "V2min    Minimum rake-off safety speed", insert -- V2min Minimum take-off safety speed --

Column 10,
Line 6, delete "the step of displaying an error message if calculated center", insert -- the step of displaying an error message if a calculated center --

Signed and Sealed this

Twenty-sixth Day of March, 2002

Attest:

Attesting Officer

JAMES E. ROGAN
*Director of the United States Patent and Trademark Office*